United States Patent Office

3,142,673
Patented July 28, 1964

3,142,673
DERIVATIVES OF 6-AMINOPENICILLANIC ACID
Donald C. Hobbs, East Lyme, Conn., assignor to Chas. Pfizer & Co., Inc., New York, N.Y., a corporation of Delaware
No Drawing. Filed Mar. 31, 1961, Ser. No. 99,715
12 Claims. (Cl. 260—239.1)

This invention relates to new antibiotic compounds and their salts and, more particularly, to novel 6-aminopenicillanic derivatives and pharmaceutically acceptable salts thereof which are active against the antibiotic resistant Staphylococci.

The term "penicillin" describes a group of acyl derivatives of 6-aminopenicillanic acid which differ only in the nature of the R group and possess the general Formula I wherein the acyl moiety is derived from a carboxylic acid or functional derivative thereof such as an acyl chloride, anhydride or amide.

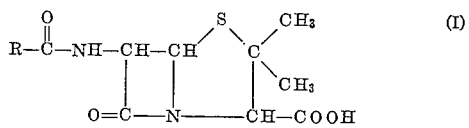

The properties, particularly the antibiotic properties, of a given penicillin are determined to a large extent by the R group. The best known and most widely used penicillins, benzylpenicillin, phenoxymethylpenicillin and, more recently, α-phenoxyethylpenicillin wherein R represents the benzyl-, phenoxymethyl- and α-phenoxyethyl- radicals, while highly antagonistic toward gram positive microorganisms are ineffective against the so-called antibiotic resistant strains of bacteria, that is, the penicillin or antibiotic resistant Staphylococci, and are readily destroyed by penicillinase. Antibiotic resistant bacteria, Staphylococci in particular, are becoming the most important cause of severe infections and deaths in hospitals today. Therefore, drugs which will combat the continuing rise in Staphylococci incidence and fatality are of immeasurable value to the medical profession.

It has been unexpectedly found that derivatives of α-carboxylmethyl penicillin possess surprising activity against the antibiotic resistant Staphylococci both in vitro and in vivo. Moreover, this in vivo activity is exhibited upon oral or parenteral administration of these valuable products. The novel compounds of the present invention have Formula II:

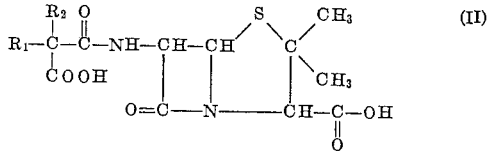

wherein $R_1$ is selected from the group consisting of straight- and branched-chain alkyl containing up to six carbon atoms, which may be interrupted by oxygen or sulfur; straight- and branched-chain alkenyl containing two to six carbon atoms; saturated and mono-unsaturated five- and six-membered alicyclic; straight- and branched-chain alkoxy containing up to six carbon atoms; straight- and branched-chain alkylmercapto containing up to six carbon atoms; phenyloxy; phenylmercapto; phenyl and substituted phenyl wherein the substituent is selected from the group consisting of methyl, ethyl, chloro, bromo, nitro, amino, methoxy, ethoxy and trifluoromethyl; benzyl and substituted benzyl wherein the substituent is selected from the group consisting of methyl, ethyl, chloro, bromo, nitro, amino, methoxy, ethoxy and trifluoromethyl; $R_2$ is selected from the group consisting of hydrogen and $R_1$; and $R_1$ and $R_2$ when taken together are benzylidene.

When $R_1$ is straight- or branched-chain alkyl containing an interrupting oxygen or sulfur atom, its preferred structure is represented by the formula $R_4$—X—$R_3$— wherein $R_3$ is selected from the group consisting of methylene and ethylene; $R_4$ is selected from the group consisting of straight- and branched-chain alkyl containing up to four carbon atoms; and X is selected from the group consisting of oxygen and sulfur.

These novel compounds wherein $R_1$ and $R_2$ are different can exist in epimeric "D" and "L" forms. It will be convenient to refer to these epimers as the D- and L-epimers. Therefore, included within the purview of this invention are the D- and the L-epimers and mixtures thereof of the compounds of Formula II above, each of which exhibits substantial therapeutic activity.

Also included within the scope of this invention are the pharmaceutically acceptable salts of the novel compounds of Formula II in which one or both acid groups are involved in salt formation. Salts such as the sodium, potassium, calcium, magnesium, ammonium and substituted ammonium salts, e.g., procaine, dibenzylamine, N,N'-dibenzylethylenediamine, N,N-bis(dehydroabietyl)-ethylenediamine, l-ephenamine, N-ethylpiperidine, N-benzyl-β-phenethylamine, triethylamine, as well as salts with other amines which have been used to form salts with benzylpenicillin are of significant activity against the antibiotic resistant Staphylococci and are useful for the preparation of pharmaceutically elegant compositions of these valuable antibiotics.

In addition to their unexpected and significant activity against the antibiotic resistant Staphylococci, the novel products of this invention are resistant to destruction by penicillinase, the penicillin destroying enzyme elaborated by many microorganisms, and are also antagonistic toward Gram-positive microorganisms.

The novel products of this invention are of value as antibacterial agents and are remarkably effective in treating a number of infections caused by susceptible gram-positive bacteria in poultry and animals including man. Several of the compounds exhibit resistance to penicillinase and are effective in treating infections due to resistant Staphylococci. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration they are best used in the form of a sterile solution which may contain other solutes, for example, enough saline or glucose to make the solution isotonic.

The novel and valuable compounds of the present invention are prepared from 6-aminopenicillanic acid by any of several known methods for introducing an acyl substituent into a primary amine. They can, for example, be prepared by the reaction, in a reaction-inert solvent, of 6-aminopenicillanic acid with the desired malonic acid or its functional equivalent such as the corresponding acid chloride, bromide, or anhydride, especially the mixed anhydride with other carboxylic acids such as ethoxy and isobutoxy carbonic acid, at a pH value of from about 3 to about 9 and at a temperature of from about 0° C. to about 50° C. Alternatively, they can be prepared by the reaction of 6-aminopenicillanic acid with the appropriate acid precursor in the presence of a condensing agent, e.g., a carbodiimide, such as 1,3-dicyclohexylcarbodiimide. Still another method involves the reaction of an activated ester, e.g., a cyclic acylal prepared from the appropriate substituted malonic acid and acetone, with 6-aminopenicillanic acid. Treatment of isopropylidene phenylmalonate, the cyclic acylal of phenylmalonic acid and acetone, with 6-aminopenicillanic acid thus gives rise to the mono-amide α-carboxybenzylpencillin.

They can also be prepared by the method of Sheehan, et al., Journal of the American Chemical Society, 81, 3089 (1959), which utilizes D-penicillamine and t-butyl phthalimidomalonaldehydate as starting materials for a series of reactions. Substitution of the phenoxyacetyl chloride utilized by Sheehan et al., by, for example, $R_1R_2C(COCl)_2$, in the reaction sequence produces the potassium salt of the desired penicillin.

It is preferred to utilize the reaction of 6-aminopenicillanic acid with the desired acid chloride in the presence of an acid acceptor at a pH of from about 3.0 to about 9.0 and a temperature of from about 0° C. to about 50° C. A neutral to moderately alkaline pH level, that is pH values of from about 6.0 to about 9.0 are favored since, under these conditions, a substantial yield of the desired product is produced.

The 6-aminopenicillanic acid is prepared as described by Huang et al., J. Am. Chem. Soc. 82, 3790 (1960), which comprises the enzymatic degradation of benzylpenicillin sodium salt by the penicillin "acylase" produced by widely distributed members of the Schizomycetes, including species from such genera as Escherichia, Nocardia and Pseudomonas. It can be used in the form of the pure material dissolved or suspended in the solvent of choice, e.g., water, aqueous acetone, or in the form of a fermentation liquor or concentrate thereof.

Because of the difficulty in preparing mono acid halides of the dicarboxylic acids, the diacid halide is used as reactant. The reaction is generally conducted by the simultaneous addition of an acetone solution of the appropriate diacid halide and an aqueous solution of 6-aminopenicillanic acid of pH about 7 to an aqueous acetone solution containing sufficient sodium bicarbonate to maintain the desired pH. Under such conditions, the diacid halide apparently undergoes simultaneous hydrolysis and coupling to give the desired monosubstitution product.

When prepared in this manner the novel antibiotics are obtained as the sodium or potassium salts. They are readily converted to the acid form by neutralization of their aqueous solutions with a mineral acid, such as sulfuric or hydrochloric acid, or a suitable ion exchange resin and are recovered therefrom by standard techniques such as freeze drying or extraction with a suitable water immiscible solvent followed by removal of the solvent.

The acid forms of the novel antibiotics of the present invention are, in turn, easily converted to salts by reaction with a suitable base. Thus, treatment of the desired antibiotic in aqueous solution with ammonium hydroxide produces the ammonium salt. In like manner, other salts such as the calcium, magnesium, barium, potassium and sodium, are formed. In addition, amine salts, such as the procaine, dibenzylamine, N,N'-dibenzylethylenediamine, dehydroabietylamine, l-ephenamine and N-benzyl-β-phenethylamine salts, are prepared by reacting a solution of the desired antibiotic in an aqueous or non-aqueous solvent with the desired amine. Alternatively, the amine salts are prepared in aqueous solution by reacting a metal of the desired antibiotic, e.g. the sodium salt, with the desired amine acid salt, for example, the amine hydrochloride salt.

By employing the proper ratio of inorganic or organic base to dibasic acid, mono- or di-salts are formed. Salt formation is believed to occur first at the carboxyl group of the 6-aminopenicillanic acid moiety. The salts isolated at pH about 7.5, for example, are the mono-alkali metal salts whereas those isolated at higher pH levels are the dialkali metal salts. Treatment of α-phenoxycarboxymethylpenicillin with one mole of alkali metal hydroxide, produces the mono-alkali metal salt. Treatment with two moles of alkali metal hydroxide produces the di-alkali metal salt. Similarly, the use of one or two moles of an organic base, e.g., triethylamine, per mole of α-phenoxycarboxymethylpenicillin produces the mono- or di-triethylammonium salt.

The amide derivatives of the compounds of Formula II wherein the amide function exists in the 6-aminopenicillanic acid moiety and not in the side chain, are also valuable in the treatment of a variety of infections, particularly those caused by Gram-positive bacteria and antibiotic resistant Staphylococci. They are most readily and conveniently prepared by the acylation of the amide of 6-aminopenicillanic acid according to known procedures.

The preparation of mono-amides of Formula II wherein the amide group occurs on the α-carboxy group of the side chain is most favorably accomplished by the reaction of 6-aminopenicillanic acid with the mono-amide of the proper malonic acid in the presence of a carbodiimide. By using the amide of 6-aminopenicillanic acid in place of 6-aminopenicillanic acid, the isotelic diamide derivatives are, of course, produced.

The application of the above methods produces amides of known structure. The amidation procedure described in the literature for the formation of amides of benzylpenicillin; namely, the amidation of a simple or mixed anhydride of benzylpenicillin with ammonia, or a primary or secondary amine, when applied to the novel dibasic penicillin products of this invention, produces a mixture of products.

This application is a continuation-in-part of co-pending United States application, Serial No. 858,612, filed December 10, 1959, which in turn is a continuation-in-part of United States application, Serial No. 831,080, filed August 3, 1959, now abandoned.

The following examples are provided to further illustrate in detail methods for the procedure of the present invention. They are, however, not to be construed as limiting the invention in any way.

EXAMPLE I

To 500 ml. of a solution consisting of 200 ml. of 3% sodium bicarbonate and 300 ml. of acetone there is simultaneously added, over a period of 30 minutes, two separate solutions of equal volume (500 ml.); one an aqueous solution containing 10.8 g. of 6-aminopenicillanic acid at pH 7, and the other an acetone solution containing 13.3 g. of the diacid chloride of phenoxy malonic acid. (The diacid chloride is prepared by refluxing 9.8 g. of phenoxymalonic acid with 10 ml. thionyl chloride/g. of acid for 45 minutes. The excess thionyl chloride is then removed by distillation at 15 mm. pressure, the residue dissolved in benzene and again taken to dryness at 15 mm. pressure.) The reaction is run at room temperature. After one hour 500 ml. of water is added, the pH adjusted to 4.2 with aqueous phosphoric acid and the reaction mixture extracted with 2 x 300 ml. of cold nitromethane to remove benzylpenicillin formed by decarboxylation. The aqueous layer is retained, adjusted to pH 2.8 with aqueous phosphoric acid and extracted with 2 x 400 ml. of cold nitromethane. The nitromethane extracts are combined, washed with $\frac{1}{10}$ volume of water and the aqueous wash discarded. The nitromethane solution is then extracted with one-half volume of water, sufficient 5 N potassium hydroxide being added to bring the pH to 7.5. The aqueous layer is separated, washed with ether and lyophilized to give the mono-potassium salt of α-phenoxycarboxymethylpenicillin.

Additional α-substituted-carboxymethylpenicillins are prepared as their potassium salts by this procedure beginning with the dichloride of the appropriate malonic acid derivative. The novel penicillins thus prepared are listed below in Table I.

Table I

| $R_1$ | $R_2$ | $R_1$ | $R_2$ |
|---|---|---|---|
| $CH_3$ | H | $C_6H_{13}O$ | H |
| i-$C_3H_7$ | H | i-$C_3H_7O$ | H |
| n-$C_4H_9$ | H | i-$C_3H_7S$ | H |
| i-$C_4H_9$ | H | $C_4H_9S$ | H |
| i-$C_4H_9$ | $C_2H_5O$ | $C_4H_9S$ | H |
| $C_2H_5S$ | $C_2H_5S$ | $C_6H_{13}S$ | H |
| 2-cyclopentenyl | H | $C_2H_5S$ | $C_2H_5S$ |
| Cyclopentyl | H | $C_6H_5CH_2$ | $C_6H_5CH_2$ |
| i-Amyl | H | o-$(CH_3)C_6H_4$ | H |
| n-$C_6H_{13}$ | H | o-$ClC_6H_4$ | H |
| $C_2H_5$ | $C_2H_5$ | p-$ClC_6H_4$ | H |
| n-$C_4H_9$ | $C_2H_5$ | p-$BrC_6H_4$ | H |
| i-$C_3H_7$ | $C_2H_5$ | p-$NO_2C_6H_4$ | H |
| i-Amyl | $C_2H_5$ | m-$(C_2H_5O)C_6H_4$ | H |
| i-Butyl | $C_2H_5$ | $C_6H_5$ | $C_6H_5$ |
| $C_6H_5O$ | n-$C_4H_9$ | $C_6H_5CH_2$ | H |
| $C_6H_5O$ | $C_6H_5O$ | p-$ClC_6H_4CH_2$ | H |
| $C_6H_5$ | $C_2H_5$ | p-r-$(CH_3O)C_6H_4CH_2$ | H |
| Allyl | allyl | p-r-$(CF_3)C_6H_4CH_2$ | H |
| $C_6H_5S$ | H | 2-butenyl | H |
| $C_6H_5S$ | $CH_3$ | 3-hexenyl | H |
| $CH_3O$ | H | isobutylene | H |
| $C_4H_9O$ | H | 3-methylbuten-1-yl | H |
| $C_2H_5O$ | $C_2H_5O$ | p-$BrC_6H_4CH_2$ | H |
| | | allyl | $C_6H_5$ |

EXAMPLE II

To a solution of 19.6 g. of phenoxymalonic acid in 75 ml. of tetrahydrofuran there is added 20.6 g. of 1,3-dicyclohexylcarbodiimide in 75 ml. of tetrahydrofuran followed by a solution of 21.6 g. of 6-aminopenicillanic acid in 600 ml. of water:tetrahydrofuran (1:1) containing sufficient sodium bicarbonate to give a pH of 7.8. The mixture is stirred at room temperature for two hours, then filtered to remove 1,3-dicyclohexylurea. The filtrate is diluted to 2000 ml. with cold water then washed at pH 4.2 (adjusted with phosphoric acid) with 2 x 300 ml. of cold nitromethane to remove benzylpenicillin formed by the decarboxylation of phenoxymalonic acid. The aqueous layer is adjusted to pH 2.8 with phosphoric acid and extracted with 2 x 400 ml. of cold nitromethane. The combined nitromethane extracts are washed with $\frac{1}{10}$ volume of water and then extracted at pH 7.5 with one-half volume of water. The aqueous layer is washed with ether and lyophilized to give the mono-potassium salt of α-phenoxycarboxymethylpenicillin.

The following penicillins (Table II) are prepared by the same procedure using the suitable malonic acid derivative. The mono-potassium salts are produced in each case.

Table II

| $R_1$ | $R_2$ | $R_1$ | $R_2$ |
|---|---|---|---|
| Cyclohexyl | H | $C_6H_5$ | $C_6H_5$ |
| $CH_3$—O—$CH_2$ | H | m-$(C_2H_5)C_6H_4$ | H |
| $CH_3$—S—$CH_2$ | H | o-$(NO_2)C_6H_4$ | H |
| $CH_3$—S—$(CH_2)_2$ | H | p-$(CH_3O)C_6H_4$ | H |
| $C_4H_9$—S—$CH_2$ | H | p-$(CH_3O)C_6H_4$ | p-$(CH_3O)C_6H_4$ |
| $C_2H_5$—S—$(CH_2)_2$ | H | $CH_3O$ | $CH_3O$ |
| $CH_3$—O—$(CH_2)_2$ | H | m-$(CH_3)C_6H_4$ | H |
| $CH_3$—O—$(CH_2)_3$ | $CH_3$—O—$(CH_2)_2$ | p-$(CH_3)C_6H_4CH_2$ | $CH_3$ |
| i-$C_3H_7$—O—$C_3H_7$ | H | $C_6H_5CH_2$ | H |
| 2-cyclohexenyl | H | p-$NO_2C_6H_4CH_2$ | H |
| $C_6H_5O$ | $CH_3$ | Benzylidene | $(R_1+R_2)$ |
| n-$C_3H_7$ | n-$C_3H_7$ | n-$C_3H_7$ | H |

EXAMPLE III

Isopropylidene phenylmalonate, prepared according to the procedure of Scheuer et al., J. Am. Chem. Soc. 80, 4936 (1958), is used in this example.

To 6-aminopenicillanic acid (0.43 g.) in 20 ml. of water at pH 7 there is added isopropylidene phenylmalonate (0.22 g.) and the mixture vigorously shaken at room temperature for 3 hours. The mixture is then diluted with water, washed with ether and extracted with n-butanol at pH 2. The n-butanol extract of the penicillin acid is then extracted with water at pH 7 (pH adjusted with 5% KOH) and the aqueous solution freeze-dried to give the mono-potassium salt of α-carboxybenzylpenicillin as a powder.

EXAMPLE IV

A solution of ethylmalonic acid (1.3 g.) and triethylamine (1.54 ml.) in 20 ml. of dry acetone is thoroughly stirred and cooled to −5° C. A solution of isobutylchloroformate (1.3 ml.) in 10 ml. of dry acetone is added dropwise and, after 15 minutes, the mixture containing the mixed anhydride and triethylamine hydrochloride, cooled to −5° C. It is then slowly added to a solution of 6-aminopenicillanic acid (2.16 g.) in 20 ml. of 3% sodium bicarbonate and 5 ml. of acetone, the temperature being held at 0°–5° C. The reaction mixture is allowed to reach room temperature and, after a half hour, the mono-sodium salt of α-carboxy-n-propylpenicillin is isolated according to the procedure of Example I.

Additional penicillins wherein $R_1$ and $R_2$ have the following values (Table III) are prepared in the same manner from the appropriate malonic acid derivative.

Table III

| $R_1$ | $R_2$ | $R_1$ | $R_2$ |
|---|---|---|---|
| $C_6H_5$ | H | p-$(C_2H_5)C_6H_4CH_2$ | H |
| allyl | H | o-$(C_2H_5O)C_6H_4CH_2$ | H |
| allyl | $CH_3$ | o-$(CF_3)C_6H_4$ | H |
| n-$C_5H_{11}$ | ----- | $C_6H_5$ | $CH_3$ |
| $C_2H_5O$ | H | $C_6H_5CH_2$ | $CH_3$ |

EXAMPLE V

The products of the preceding examples are converted to their free acid forms by careful neutralization of aqueous solutions of their salts with aqueous phosphoric acid followed by extraction of the acid form into methylisobutylketone. The methylisobutylketone solutions are washed with water, dried with anhydrous sodium sulfate, filtered and evaporated to give the free acids.

EXAMPLE VI

To an aqueous solution of α-carboxy-(p-nitrobenzyl)-penicillin dipotassium salt (0.10 g.) in 80 ml. of water is added 0.10 g. of 5% palladium-charcoal and the mixture cooled to 4° C. Hydrogen is passed into the mixture at 4° C. until the uptake of hydrogen ceases. The catalyst is then removed by filtration and the filtrate freeze dried to give the dipotassium salt of α-carboxy-(p-aminobenzyl)penicillin.

The following penicillins are prepared as their dipotassium salts in like manner.

PENICILLIN

α-Carboxy-β-(p-aminophenyl)ethyl
α-Carboxy-(p-aminobenzyl)

They are converted to their acid form by absorption of the dipotassium salts on Dowex 50, hydrogen form, 100–200 mesh (a copolymer of styrene and divinylbenzene containing nuclear sulfonic acid groups, available from The Dow Chemical Co.), and elution therefrom with ammonium hydroxide. The acids are recovered by freeze-drying the eluates.

EXAMPLE VII

The free acids of Examples V and VI are transformed to their mono-sodium, calcium, magnesium, ammonium, procaine, N,N'-dibenzylethylenediamine, N-ethylpiperidine, dibenzylamine, l-ephenamine, triethylamine, N-benzyl-β-phenethylamine, N,N-bis(dehydroabietyl)ethylenediamine and benzhydrylamine salts by reaction of aqueous solutions thereof with one equivalent of the appropriate base. The salts are recovered by freeze drying.

EXAMPLE VIII

The free acids of Examples V and VI are converted to their di-sodium, potassium, calcium, magnesium ammonium, procaine, N,N' - dibenzylethylenediamine, N-ethylpiperidine, dibenzylamine, l-ephenamine, triethylamine, N-benzyl - β - phenethylamine, N,N-bis(dehydroabietyl)ethylenediamine and benzhydrylamine salts by reaction of aqueous solutions thereof with two equivalents of the appropriate base. The salts are recovered by freeze drying.

EXAMPLE IX

To 500 ml. of a solution consisting of 200 ml. of 3% sodium bicarbonate and 300 ml. of acetone there is simultaneously added, over a period of 30 minutes, two separate solutions of equal volume (500 ml.); one an aqueous solution containing 10.8 g. of the amide of 6-aminopenicillanic acid and the other an acetone solution containing 13.3 g. of the diacid chloride of phenoxy malonic acid. The reaction is run at room temperature. After one hour 500 ml. of water is added and the reaction mixture extracted (pH 7.5) with 2 x 300 ml. of cold chloroform to remove any benzylpenicillin amide formed by decarboxylation. The aqueous layer is retained, adjusted to pH 2.8 with aqueous phosphoric acid and extracted with 2 x 400 ml. of cold chloroform. The chloroform extracts are combined, washed with 2 x ¼ volumes of 1% sodium bicarbonate solution and ¼ volume of water. The solution is dried over anhydrous sodium sulfate then evaporated to dryness to give the mono-amide of α-phenoxycarboxymethylpenicillin.

The mono-amides of the α-substituted-carboxymethylpenicillins of Examples I and II are prepared by this procedure beginning with the dichloride of the appropriate malonic acid derivative.

What is claimed is:
1. A compound selected fro mthe group consisting of those having the formula:

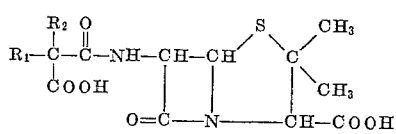

and the pharmaceutically acceptable salts thereof wherein $R_1$ is selected from the group consisting of straight- and branched-chain alkyl, oxygen-interrupted alkyl and sulfur-interrupted alkyl, of up to six carbon atoms; straight- and branched-chain alkenyl of two to six carbon atoms; cyclopentyl, cyclohexyl, 2 - cyclopentenyl and 2-cyclohexenyl; straight- and branch-chain alkoxy of up to six carbon atoms; straight- and branched-chain alkylmercapto of up to six carbon atoms; phenyloxy; phenylmercapto; phenyl and substituted phenyl wherein the substituent is selected from the group consisting of methyl, ethyl, chloro, bromo, nitro, amino, methoxy, ethoxy and trifluoromethyl; benzyl and substituted benzyl wherein the substituent is selected from the group consisting of methyl, ethyl, chloro, bromo, nitro, amino, methoxy, ethoxy and trifluoromethyl; $R_2$ is selected from the group consisting of hydrogen and $R_1$; and $R_1$ and $R_2$ when taken together are benzylidene.

2. The compound represented by the formula of claim 1 wherein $R_1$ is alkyl of up to six carbon atoms and $R_2$ is hydrogen.

3. The compound represented by the formula of claim 1 wherein $R_1$ is phenoxy and $R_2$ is alkyl of up to six carbon atoms.

4. The compound represented by the formula of claim 1 wherein $R_1$ is alkenyl of up to six carbon atoms and $R_2$ is hydrogen.

5. The compound represented by the formula of claim 1 wherein $R_1$ is phenyl and $R_2$ is alkyl of up to six carbon atoms.

6. The compound represented by the formula of claim 1 wherein $R_1$ is $R_4$—X—$R_3$; $R_3$ is alkylene of up to two carbon atoms, $R_4$ is alkyl of up to four carbon atoms, $R_2$ is hydrogen and X is oxygen.

7. The monopotassium salt of α-phenyl-carboxymethylpenicillin.

8. The monopotassium salt of α,α-diphenoxycarboxymethylpenicillin.

9. α-Carboxy-n-propylpenicillin.

10. The sodium salt of α-carboxy-γ-methylbutylpenicillin.

11. The mono-potassium salt of α-allylmercapto-carboxymethylpenicillin.

12. The dipotassium salt of α - phenoxy - α - carboxyethylpenicillin.

References Cited in the file of this patent
UNITED STATES PATENTS
2,941,995    Doyle et al.   _____ June 21, 1960

FOREIGN PATENTS
569,728    Belgium   _____ Nov. 15, 1958

OTHER REFERENCES
Wertheim: Textbook of Organic Chemistry, pp. 763–764 (1945).
Morton: The Chemistry of Heterocyclic Compounds, page VI of the preface (1946).
Burger: Medicinal Chemistry, page 46 (1960).